June 11, 1929.  M. M. DELGADO  1,716,431
SPRING ATTACHMENT
Filed June 20, 1927
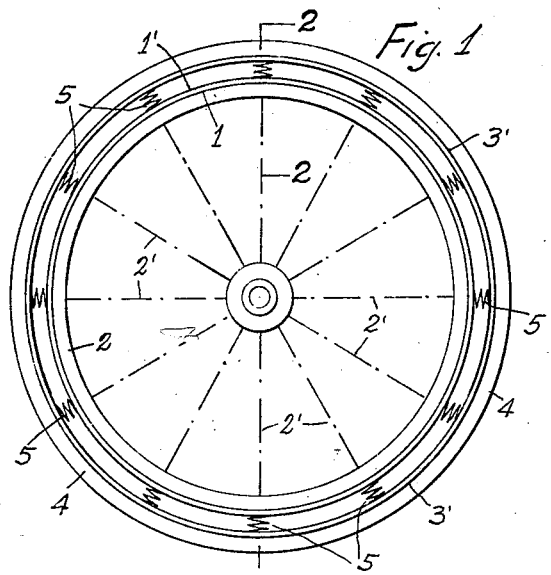
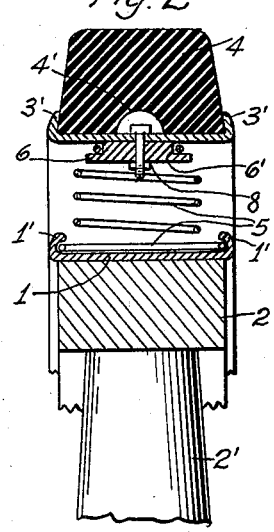
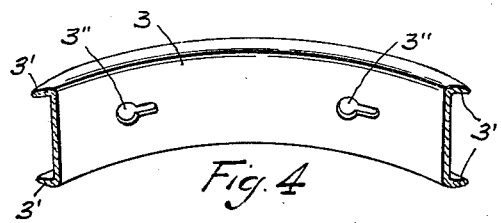
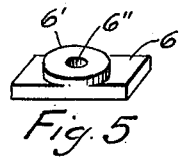
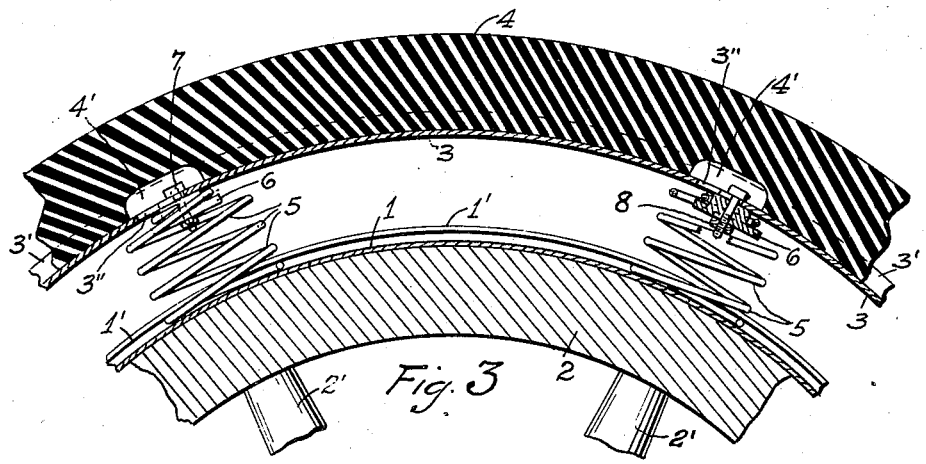
M. M. Delgado, INVENTOR
By Marks & Clark, Attys.

Patented June 11, 1929.

1,716,431

UNITED STATES PATENT OFFICE.

MANUEL MARTIN DELGADO, OF HABANA, CUBA.

SPRING ATTACHMENT.

Application filed June 20, 1927, Serial No. 200,196, and in Cuba November 28, 1926.

The present invention relates to vehicle wheels and more particularly to resilient wheels adapted to absorb shocks incident to irregularities in roads and pavements.

It is an object of the invention to mount a tire on a wheel in spaced relation thereto, cushioning springs being interposed between the tire and the wheel. It is also an object of the invention to provide novel means for securing the springs to the wheel and tire. These means permitting attachment and dismounting of the tire with minimum difficulty. It is a further object to provide springs which are interchangeable and replaceable when broken.

The invention will be more fully understood from the following description taken in connection with the appended drawing in which:

Fig. 1 is a front elevation of the assembled wheel, the spokes being shown diagrammatically;

Fig. 2 is a partial sectional view of the wheel taken on the line 2—2 of Fig. 1;

Fig. 3 is a circumferential sectional view of a portion of the wheel;

Fig. 4 is a perspective view of a section of the wheel rim; and

Fig. 5 is a perspective view of one of the fastening elements.

Referring to the drawings it will be seen that a rim 1 having side flanges 1' is mounted on the felly 2 of the wheel having the usual spokes 2'. Concentrically disposed with respect to the rim 1 is a second rim 3, also provided with side flanges 3' designed to hold the rubber tire 4 on the rim. The rims 1 and 3 are held in spaced relation, a plurality of springs 5 being interposed at suitable spaced intervals around the circumference of the wheel and between the two rims. One end of each of the springs has a sufficiently large circumference to be engaged and held by the flanges 1', as shown in Fig. 2. The other end of each spring is engaged by a block or plate 6 having a circular boss 6' and an aperture 6'' through which a headed bolt 7 passes. It will be seen that the circumference of the outer end of spring 5 is approximately the same as that of the boss 6' but that the plate 6, which is preferably rectangular, is larger in at least one direction than the diameter of the coil at the outer end of the spring.

At spaced intervals in the rim 3, corresponding to the spacing of the springs with respect to each other, are longitudinal slots 3'', the width of each of which is approximately equal to the diameter of the bolt 7. Each slot has an enlargement at one end to permit insertion of the head of the bolt, the underside of the tire having recesses 4' disposed over the slots to permit such insertion. Each bolt 7 is also provided with a threaded end portion on which the nut 8 is screwed to hold the plates 6 and the outer ends of springs 5 in engagement with rim 3.

The manner in which the wheel and tire are assembled will be apparent from the above description.

The inner end of each spring is engaged by the flanges 1' while the outer end of the spring is clamped in engaging position with rim 3 by the plate 6, the latter member being held tight against the rim by bolt 7 and nut 8. When it is desired to dismount the tire or change one of the springs each nut 8, or the nut holding the springs to be removed, is unscrewed and the head of the bolt 7 can be moved into the enlarged portion of slot 3'' to permit its removal.

Having described my invention what I claim is:

A clamping device for attaching a coil spring to a resilient wheel comprising a rim having a longitudinal slot therein, said slot being enlarged at one end, an apertured block cooperating with one end of the spring. A headed bolt adapted to be pressed through said enlarged end to engage the slotted portion of said rim, said bolt also passing through said block, and means for adjusting said block with respect to the head of the bolt, whereby said rim is clamped between said head and said block.

In testimony whereof I affix my signature.

MANUEL MARTIN DELGADO.